US011526713B2

(12) United States Patent
Anderson

(10) Patent No.: US 11,526,713 B2
(45) Date of Patent: Dec. 13, 2022

(54) EMBEDDING HUMAN LABELER INFLUENCES IN MACHINE LEARNING INTERFACES IN COMPUTING ENVIRONMENTS

(71) Applicant: Intel Corporation, Santa Clara, CA (US)

(72) Inventor: Glen J. Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1044 days.

(21) Appl. No.: 16/145,601

(22) Filed: Sep. 28, 2018

(65) Prior Publication Data
US 2019/0042894 A1    Feb. 7, 2019

(51) Int. Cl.
*G06K 9/62* (2022.01)
*G06N 20/00* (2019.01)
(Continued)

(52) U.S. Cl.
CPC ........... *G06K 9/6293* (2013.01); *G06K 9/629* (2013.01); *G06K 9/6254* (2013.01);
(Continued)

(58) Field of Classification Search
CPC .. G06K 9/6293; G06K 9/6254; G06K 9/6257; G06K 9/6256; G06K 9/6262; G06K 9/6273; G06N 20/00; G06V 30/194
See application file for complete search history.

(56) References Cited

U.S. PATENT DOCUMENTS 8,226,572 B2 * 7/2012 Keith ................... A61B 5/7267
600/549
10,762,440 B1 * 9/2020 Garg ..................... G01S 13/867
(Continued)

FOREIGN PATENT DOCUMENTS

| CN | 110969257 A | 4/2020 |
| EP | 3629243 A1 | 4/2020 |

OTHER PUBLICATIONS

Extended European Search Report EP Application No. 19182743.5, dated Jan. 2, 2020, 8 pages.
(Continued)

*Primary Examiner* — Qun Shen
(74) *Attorney, Agent, or Firm* — Jaffery Watson Mendonsa & Hamilton LLP

(57) ABSTRACT

A mechanism is described for facilitating embedding of human labeler influences in machine learning interfaces in computing environments, according to one embodiment. A method of embodiments, as described herein, includes detecting sensor data via one or more sensors of a computing device, and accessing human labeler data at one or more databases coupled to the computing device. The method may further include evaluating relevance between the sensor data and the human labeler data, where the relevance identifies meaning of the sensor data based on human behavior corresponding to the human labeler data, and associating, based on the relevance, human labeler data with the sensor data to classify the sensor data as labeled data. The method may further include training, based on the labeled data, a machine learning model to extract human influences from the labeled data, and embed one or more of the human influences in one or more environments representing one or more physical scenarios involving one or more humans.

20 Claims, 11 Drawing Sheets

(51) Int. Cl.
 *G06N 3/04* (2006.01)
 *G06N 3/08* (2006.01)
 *G06V 30/194* (2022.01)

(52) U.S. Cl.
 CPC ......... *G06K 9/6256* (2013.01); *G06K 9/6257* (2013.01); *G06K 9/6262* (2013.01); *G06K 9/6273* (2013.01); *G06N 3/0454* (2013.01); *G06N 3/0472* (2013.01); *G06N 3/08* (2013.01); *G06N 20/00* (2019.01); *G06V 30/194* (2022.01)

(56) References Cited

U.S. PATENT DOCUMENTS

| | | | | |
|---|---|---|---|---|
| 2011/0276396 | A1* | 11/2011 | Rathod | H04W 4/60 707/706 |
| 2012/0269441 | A1* | 10/2012 | Marchesotti | G06V 10/806 382/195 |
| 2015/0332087 | A1* | 11/2015 | Joshi | G06V 10/42 382/203 |
| 2017/0160813 | A1* | 6/2017 | Divakaran | G10L 25/63 |
| 2019/0102656 | A1* | 4/2019 | Kwant | G06N 3/08 |
| 2019/0197778 | A1* | 6/2019 | Sachdeva | G06T 15/30 |

OTHER PUBLICATIONS

Tylecek, Radim et al., "Consistent Semantic Annotation of Outdoor Datasets via 2D/3D Label Transfer", School of Informatics, SENSORS, vol. 18, No. 7, Jul. 12, 2018 (Jul. 12, 2018), pp. 1-20, XP55653466.

Sogaard, Anders, et al., "Selection Bias, Label Bias, and Bias in Ground Truth", Proceedings of COLING 2014, the 25th International Conference on Computational Linguistics: Tutorial Abstracts, Dublin, Ireland, Aug. 29, 2014 (Aug. 29, 2014), pp. 11-13, XP55653476.

Communication Pursuant to Article 94(3) EPC in EP Application No. 19182743.5, dated Dec. 2, 2021, 5 pages.

* cited by examiner

EMBEDDING HUMAN LABELER INFLUENCES IN MACHINE LEARNING INTERFACES IN COMPUTING ENVIRONMENTS

FIELD

Embodiments described herein relate generally to data processing and more particularly to facilitate embedding of human labeler influences in machine learning interfaces in computing environments.

BACKGROUND

In conventional techniques, human references are often used for naming objects in images, identifying sounds in audio clips, detecting activities in video clips, etc. However, such conventional techniques are severely limited in that they ignore a great deal of human behavior and other such variables, such as uncertainties of human conduct, preferences, biases, etc. Such deficiencies are carried over into conventional inference models, making today's machine learning models somewhat incomplete and inconclusive.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
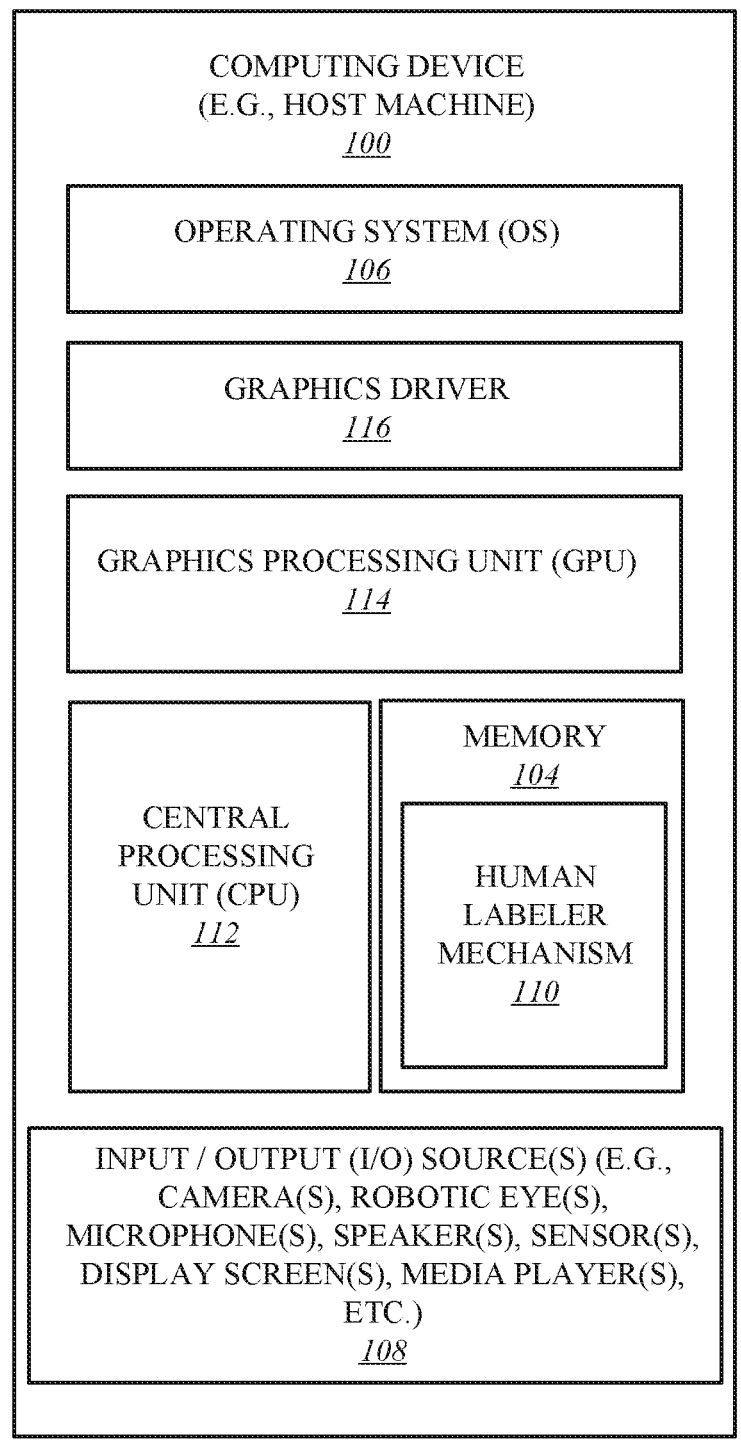
FIG. 1 illustrates a computing device employing a human labeler mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for embedding human labeler influences in machine learning interfaces in computing environments. In one embodiment, this novel technique is achieved through acquiring human labeler data (such as through sensors, historical data, categorical data associated with personal profile, etc.) and associating such human labeler data with sensor data for classifying human behaviors and variables and embedding such knowledge into machine learning models, deep learning neural networks, etc., to make such models and networks more intelligent so they may exact proper human behaviors, variables, etc. In one embodiment, human labeler data is used for detecting and considering human behavior and variables that occur at various times, such as before or during or after a final classification decision is made in training a neural network or other machine learning models.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a human labeler mechanism 110 according to one embodiment. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, human labeler mechanism 110 may be hosted by memory 108 in communication with I/O source(s) 104, such as microphones, speakers, etc., of computing device 100. In another embodiment, human labeler mechanism 110 may be part of or hosted by operating system 106. In yet another embodiment, human labeler mechanism 110 may be hosted or facilitated by graphics driver 116. In yet another embodiment, human labeler mechanism 110 may be hosted by or part of graphics processing unit ("GPU" or simply graphics processor") 114 or firmware of graphics processor 114. For example, human labeler mechanism 110 may be embedded in or implemented as part of the processing hardware of graphics processor 114. Similarly, in yet another embodiment, human labeler mechanism 110 may be hosted by or part of central processing unit ("CPU" or simply "application processor") 112. For example, human labeler mechanism 110 may be embedded in or implemented as part of the processing hardware of application processor 112.

In yet another embodiment, human labeler mechanism 110 may be hosted by or part of any number and type of components of computing device 100, such as a portion of human labeler mechanism 110 may be hosted by or part of operating system 116, another portion may be hosted by or part of graphics processor 114, another portion may be hosted by or part of application processor 112, while one or more portions of human labeler mechanism 110 may be hosted by or part of operating system 116 and/or any number and type of devices of computing device 100. It is contemplated that embodiments are not limited to certain implementation or hosting of human labeler mechanism 110 and that one or more portions or components of human labeler mechanism 110 may be employed or implemented as hardware, software, or any combination thereof, such as firmware.

Computing device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
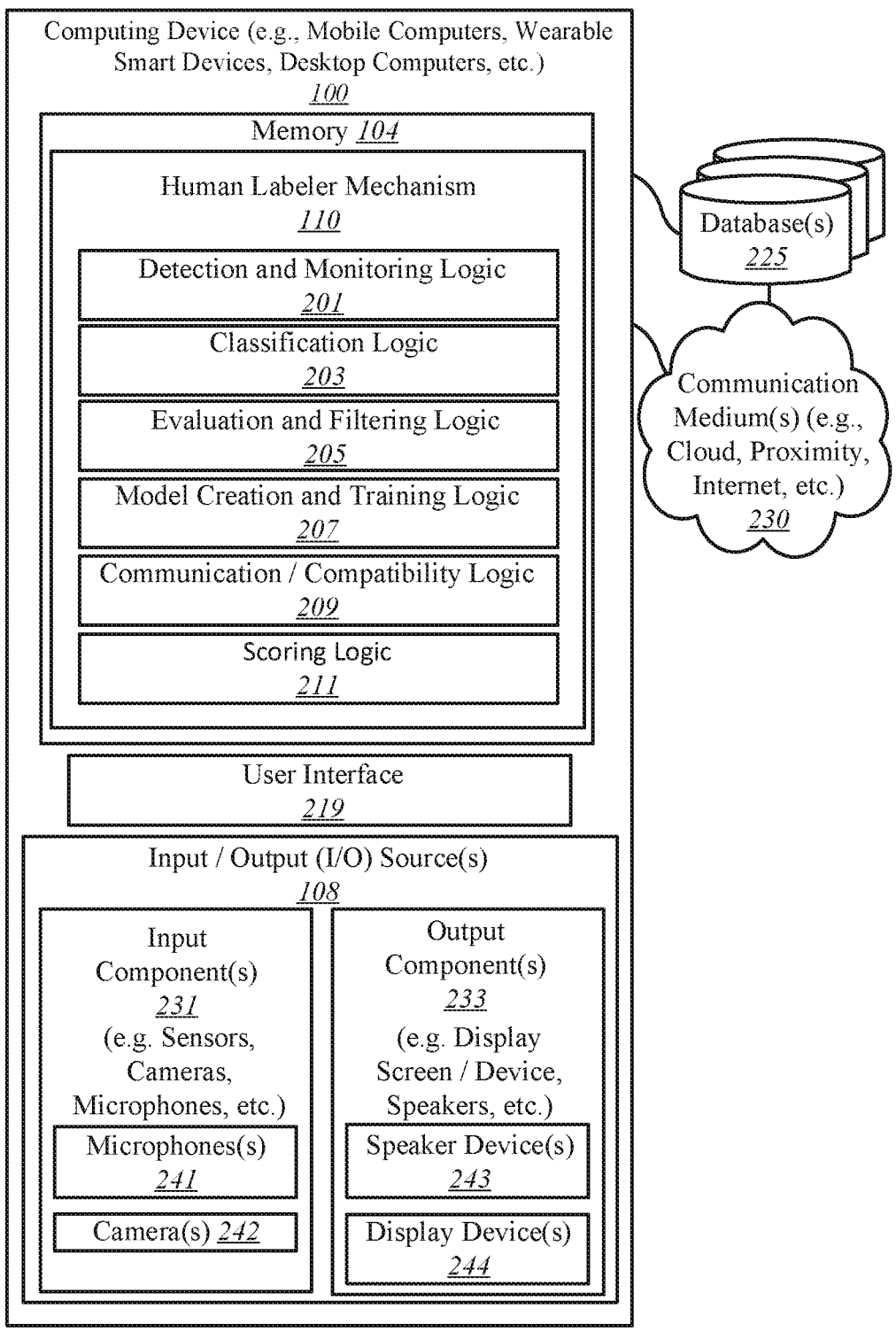
FIG. 2 illustrates a human labeler mechanism according to one embodiment.

FIG. 2 illustrates human labeler mechanism 110 of FIG. 1 according to one embodiment. For brevity, many of the details already discussed with reference to FIG. 1 are not repeated or discussed hereafter. In one embodiment, human labeler mechanism 110 may include any number and type of components, such as (without limitations): detection and monitoring logic 201; classification logic 203; evaluation and filtering logic 205; model creation and training logic 207; communication/compatibility logic 209; and scoring logic 211.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as application processor 112 and/or graphics processor 114 of FIG. 1, to facilitate or execute the corresponding logic to perform certain tasks.

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

As previously described, human references may be used for labeling data for training neural networks, such as to name an object in an image, identify a sound in an audio clip, detect an activity in a video clip, etc. In some cases, mechanical turk is used as a service for such labeling. For example, after human labeling is gathered, heuristics may be used to select the data in training, such as in some cases, a minimum percent of agreement across labelers may be desired. Nevertheless, conventional techniques ignore or disregard a great deal of human behavior (and other variables), such as what if a labeler takes longer than normal time to decide on a classification that has potential meaning in the inference model that is created. It is contemplated that Decision Field Theory and other models of decision-making have long demonstrated and modelled how uncertainty leads to longer decision-making time, where this uncertainty in labelling may be used in creation of inference models, such as observations like lack of diversity in race or gender may be used to impact an inference model.

A well-known example of Frogger has demonstrated that humans think aloud, such as while playing Frogger, to create a corpus of utterances for an explainable artificial intelligence (AI) interface to use to indicate what a person may say when making the same decision and/or choice as the AI that the person was trained to play. For example, any utterances and training of AI to play may be done separately, such as a player not using the epochs that created the machine learning to play the game. However, the Frogger example does not include any true evaluation or judgement from the labelers in the inference model, but just an associated utterance.

Another known technique is eye-tracking, which has been used to annotate object locations within an image to create bounding boxes, such as how long a fixation lasts may also signify its importance. Based on derivatives of any fixation points (with humans giving instructions to look for an object type), objects are delineated to establish ground through in an automated way. The idea of monitoring human reactions to label data can be used and applied in several situations, such as monitoring emotional reactions to train a robot.

Further, semantic and categorical data may be fused with sensor data (e.g., video streams, images, sounds, etc., of scenes), such as data captured through camera(s) 242, microphone(s) 241, accelerometers, and other such sensors and detectors, in creating machine learning interference model, where, for example, semantic data fusion may be divided into multiple categories of methods, such as: multi-view learning-based method, similarity-based method, probabilistic dependency-based method, and transfer learning-based method. Such methods may be used for knowledge fusion as opposed to schema mapping and data merging, which distinguishes between cross-domain data fusion and traditional data fusion. For example, if a CNN is trained based on images that contain an object of interest, a second stage of fusion (e.g., weighting with uncertainty data, using probabilistic dependency (or one of the other fusion types) may produce the final model and thus integrating the human behavior into the model.

For deep learning, multimodal fusion is becoming common. As will be further illustrated and described with reference to FIGS. 4A-4B, a solution for utterances of the labeler may be standard audio/video fusion approaches with CNN and RNN combined models being fused early or late. Further, image content and textual description-based detection fusion may be used, such as relying on vector concatenation for both early and late fusion schemes to obtain a multimodal representation, while, in some cases, for late fusion, a probabilistic outcome score may be concatenated after visual analysis as facilitated by scoring logic 211. This probabilistic score may result from textual analysis and kept for future use when analyzing the same or similar human behaviors and/or variables for certain machine learning models and neural networks.

Embodiments provide for a novel technique for detecting and determining human behaviors and variables around conscious data labeling tasks, such as through human labeler data obtained through sensors, historical data, categorical data, personal profile data, etc., as facilitated by human labeler mechanism 110. For example, distinct from eye tracking or emotional reactions, embodiments provide for a novel technique for showing a labeling decision through latency, such as repeatedly playing a sample before classifying, or other similar specific behaviors as facilitated by human labeler mechanism 110. Alternatively, for example, embodiments may deal with tackling various human behaviors (or personal variables like gender) that precede a classification decision, where human labeler behaviors and/or variables or their influences are added actual machine learning model, neural networks, etc., as facilitated by human labeler mechanism 110.

In one embodiment, detection and monitoring logic 201 may be used to detect, observe, and/or monitor various human labeler data associated with human behaviors and/or variables that can occur before, during, and/or after a final classification decision in training neural networks and/or other machine learning models. Similarly, detection and monitoring logic 201 is used to detect, observe, and/or monitor sensor data by facilitating one or more sensor and/or detectors, such as camera(s) 242, microphone(s) 241, touch sensors (e.g., touch pads, touch panels, etc.), capacitors, radio components, radar components, scanners, and accelerometers, etc. to capture objects (e.g., living beings (e.g., persons, animals, plants, etc.), non-living things (vehicles, furniture, rocks, etc.)) within a scene, whether be indoors or outdoors, where such capture includes video streams, images, sounds, etc. For example, sensor data may include information obtained through direct observation of a person, such as capturing images through camera(s) 242, voices or sounds through microphone(s) 241, movements through other sensors, etc. In one embodiment, as will be further described later in this document, sensor data may be classified based on human labeler data, where this human labeler data is used as a reference to define and associate various human behaviors and variables corresponding to various portions of the sensor data.

For example, once human labeler data is detected and/or monitored by detection and monitoring logic 201, classification logic 203 may then be triggered to classify any sensor data based on the human labeler data to for the various portions of the sensor data to be meaningful in terms of creating and/or training machine learning models, neural networks, etc., so the models/networks may intelligently incorporate and apply human behaviors and/or variables in their inferences and outputs.

In one embodiment, upon detecting, obtaining, and/or monitoring of human labeler data by detection and monitoring logic 201, the sensor data is then classified based on the human labeler data to reflect the various human behaviors and other variables. For example, the following are some of the examples of potentially meaningful human labeler data that reflect human behaviors or other observable variables: 1) time to decide on a label may indicate visual difficulty for a person, which may have relevance, such as red green blue (RGB)-based autonomous recognition; 2) tilting of head, squinting of eyes, closing of eyes, repeatedly listening when classifying an audio sample by indicating more difficult decisions, etc.; 3) "extraneous" verbalizations (e.g., "ummm", "huh", etc.) during visual classification may indicate a certain feeling or reservation, such as hesitation in performing an act or being surprised at seeing something, etc.

Similarly, other examples may include: 4) human labelers being instructed to "think aloud" while classifying data to increase the available verbal data (e.g., "this looks iffy", "maybe this is a cat", etc.). For example, unlike the Frogger, in one embodiment, nature of utterances are evaluated during actual labeling to then be used in an inference model training; 5) rate of movement of a person when using touch input or delineated objects; 6) number of sniffs taken by a person before classifying a smell; 7) other variables associated with a person, such as race, gender, nationality, location, country, etc.

It is contemplated that observable variables like race, gender, nationality, ethnicity, religious affiliation, political leaning, sexual orientation, etc., may also involve other considerations or classifications, such as bias, discrimination, and other similar ethical or moral AI issues. As will be further described in this document, evaluation and filtering logic 205 may be triggered to deal with such variables that can trigger discrimination or bias. For example, evaluation and filtering logic 205 may, in one embodiment, filter out such variables, such as if they are considered minor or irrelevant or nuisance, or instead, in another embodiment, incorporate and apply such variables for proper creation and/or training of machine learning models, neural networks. For example, model creation and training logic 207 may provide the pertinent training to ensure such variables are intelligently inferred and applied by machine learning models, neural networks, etc., to provide realistic outcomes that are not tainted by unintentional bias.

In one embodiment, upon classification of sensor data based on human labeler data, evaluation and filtering logic 205 may then be triggered to evaluate and determine the value or usefulness of the classified sensor data and the associated human labeler data in terms of their associated and classified human behaviors and/or variables for applying them to machine learning models, deep learning neural networks. For example, evaluation and filtering logic 205 may determine that less conclusive human labeler data samples (such as ones where the labeler data shows more doubt, hesitation, etc.) may have or be assigned lesser weight when creating an inference to be performed in a simplistic application. Similarly, if an inference is performed in complex situations, a machine learning model may be created with more challenging samples (such as where labelers took longer to decide) to be desirable and conclusive. For an individual inference model, the use or non-use of human labeler data may be tested with sample data.

Further, as described above, evaluation and filtering logic 205 may be used to filter out one or more of the human variables associated with one or more of inaccuracies, unintended consequences, and biases, such as variables based on one or more of age, gender, race, ethnicity, national origin, religion, religious affiliation, political leanings, sexual orientation, and/or the like. The filtered out human variables may further include accidental acts, coincidental items, etc., or when a co-variate is treated as a nuisance variable to be filtered out.

For example, since certain extraneous human behaviors or variables associated with human labeler data may potentially harm the training of a machine learning model, neural network, etc., such as if someone leaves a cup of coffee for 5 minutes, that 5-minute wait may be regarded as "hesitation", in one embodiment, evaluation and filtering logic 205 may evaluate and choose to filter out this hesitation so it does not unnecessarily influence the model or neural network.

However, it is contemplated that such variables may be filtered out if they seem minor or irrelevant and that in some embodiment, these variables are considered, evaluated, and applied for correspondingly intelligent results. For example, evaluation and filtering logic 205 evaluates if there are labelers that are all of Race A, where they may tend to bias their labeling against persons of Race B, even if unintentionally. For example, if a labeler's purpose is to circle a shoplifter in an image, using the race of the labeler (e.g., Race A) and that of the labeled (e.g., Race B) may be tainted with societal or unintentional bias, such as the observation of Race A may bias the observation of the person of Race B in the image.

Accordingly, in one embodiment, evaluation and filtering logic 205 evaluates and adjusts this co-variate to have some correspondence and sense between the two variables associated with the labeler and the labeled and communicates this adjustment (such as to take the potential bias into consideration) to model creation and training logic 207 so that adjustment is incorporated and applied in machine learning models, neural networks, etc., for intelligent and realistic inference analysis and resulting outcomes.

Similarly, in one embodiment, evaluation and filtering logic 205 may then be used to determine whether any of the labeled and classified sensor data may be used to add predictivity to machine learning models, neural networks, etc., by regarding this as another source of data. For example, evaluation and filtering logic 205 possess intelligence to vary the usefulness of any labeled and classified data based on the its application to and output from machine learning models and/or neural networks. For example, a more explainable AI (XAI) may be enabled and used by allowing such machine learning models, neural networks, etc., with different labeler demographics or other potential biases to be compared for different uses and on different data sets. This may be regarded as an ongoing way of enabling a form of XAI, such as without having to change or fix the entire XAI challenge.

Further, in distinguishing from the conventional eye tracking techniques, embodiments provide for determining latency in showing a decision, repeatedly playing a sample before classifying, or other specific behaviors and variables as facilitated by evaluation and filtering logic 205. Alternatively, embodiments provide for a novel technique for determining human labeler data-based behaviors and/or variables that precede classification decisions (as opposed to behaviors like eye movements) and/or uncertainly in behavior and use of an uncertainty estimate as facilitated by evaluation and filtering logic 205.

In one embodiment, an uncertainly estimate refers to a level of uncertainty associated with each labeler, which is measured by evaluation and filtering logic 205 in any number of ways, depending on which way is regarded as most suitable for an application, such as (but not limited to): 1) response time in making a classification for an image or a sound; 2) presence or absence of a degree of eye squint (or head tilt, movement of head toward screen, etc.) while making a classification of an image or a sound; 3) number of extraneous verbalizations during visual classifications; 4) touch input time to delineate an object; 5) number of sniffs to classify a smell; and 6) count of evaluative words, like "similar", "difficult", "cannot tell", "same", etc.

Further, in one embodiment, uncertainty may not be the only variable of interest for human labeler tracking based on human labeler data, as other examples may include (but not limited to): 1) emotional response as detected by facial expression; 2) heart rate, heart rate variability, galvanic skin response, etc., to indicate excitement level; and 3) variables about the labeler, such as race, age, gender, nationality, country of origin, and other similar aspects that may cause or be associated with bias in labelling.

For example, evaluation and filtering logic 205 may evaluate labeled data based on researched and/or considered well-known human behaviors and/or variables, such as a mean response time per image (such as the time from the onset of the image to the pressing of the button) may be 889 ms for humans, etc., while drawing a bounding box has been shown to take 26 seconds, etc. Stated differently, there can be a wide range in labeler response time (RT) depending on the task. While human RT follows slightly skewed distributions (though close to normal), trimming data with standard deviation may be easily done. For example, any times that are 2 STDV above the mean RT may be filtered out and as for verbalizations, gestures, or other explicit behaviors that indicate hesitation, behaviors of interest may be defined for that specific task. For repeated plays of audio or video contents, simple frequencies may be tracked, with extreme repetitions above an appropriate threshold being filtered out. Further, in cases where human labeler data is absent (e.g., no facial expression change), some fusion approaches are regarded as more tolerant of sparse data.

In one embodiment, model creation and training logic 207 may then be triggered to apply the findings and evaluations of labeled/classified sensor data, such as based on labeled data-based behaviors and/or variables, to generate and/or train machine learning models/neural networks to allow for valuable and conclusive and reliable machine learning models, deep learning neural networks, etc. For example, in one embodiment, to create a new machine learning model, model creation and training logic 207 may be used to simply create multiple machine learning inference models using labeled sensor data from the specific measures of uncertainty, such as using human labeler "quick decision" data.

In some embodiments, such as in case of late fusion, after any models are trained separately for and using sensor data and labeler data being stored and maintained at database(s) 225, scoring logic 211 may then be triggered to compute a score for each portion or element of human labeler data based on averaging the outcomes of each machine learning model or neural network based on the human labeler data. For example, such scores may be kept and maintained, such as at one or more database(s) 225, to then be used in the future, such as when training a machine learning model, when similar or the same human labeler data or behavior/variable is encountered to add efficiency and preservation of system resources to the process.

Further, in one embodiment, semantic data may be used with sensor data to build machine learning models, neural networks, based on heterogenous data, such as after training a model or a neural network on features, another stage using semantic data may be used to create a machine learning model with semantic variables, as facilitated by model creation and training logic 207. Categories of semantic fusion may include: multi-view-based, similarity-based, probabilistic dependency-based, and transfer-learning-based methods. Further, in another embodiment, a fused model may be generated by model creation and training logic 207 using early fusion and late fusion approaches, where human labeler data is treated as just another source of sensor data (e.g., audio, visual, audio-visual, etc.).

Considering an example, sensor data may be detected using one or more sensors, such as camera(s) 242, microphone(s) 241, of computing device 100, while human labeler data is accessed at database(s) 225, as facilitated by detection and monitoring logic 201. In one embodiment, evaluation and filtering logic 205 may be triggered to evaluate any relevance between the sensor data and the human labeler data such that the relevance identifies the meaning of the sensor data based on human behavior corresponding to the human labeler data. In one embodiment, classification logic 203 may then be triggered to associate, based on the relevance, the human labeler data with the sensor data to classify the sensor data as labeled data, while model creation and training logic 207 is then uses the labeled data to facilitate training of a machine learning model to extract human influences from the labeled data, and embed one or more of the human influences in one or more environments representing one or more physical scenarios involving one or more humans.

Continuing with the example, training may be used to facilitate the machine learning model to interpret, based on the labeled data, the human influences according to multiple environments prior to embedding the one or more human influences in the one or more environments, where, for example, the interpretation of the human influences is based on acceptances of the human behavior and exceptions to the human behavior as derived from the labeled data and based on the relevance.

For example, the acceptances of the human behavior are based on verified data obtained from one or more of personal profiles, cultural traits, historical norms, societal preferences, personal prejudices, societal biases, habits, etc. For example, the exceptions to the human behavior are based on unverified data obtained from one or more of coincidences, accidents, inaccuracies, flukes, unintended consequences, etc., such that one or more of the human behaviors may be filtered out based on one or more of the exceptions to avoid associating inaccuracies to the human influences.

For example, the relevance is further based on a human-variables portion of the human behavior, where the human-variables portion is based on human variables that incite personal prejudices or the societal biases, where such human variables may include one or more of age, gender, race, ethnicity, national origin, political affiliation, religious association, sexual orientation, etc.

In some embodiments, the machine learning model includes a unified machine learning model based on the sensor data and the human labeler data, where the unified machine learning model is employed during an early fusion scheme of a multimodal machine learning environment. In this case, the early fusion scheme represents early fusing of the sensor data and the human labeler data.

In some embodiments, the machine learning model includes separate machine learning models, where a first machine learning model of the separate machine learning models is based on the sensor data and not the human labeler data, and a second machine learning model of the separate machine learning models is based on the human labeler data and not the sensor data. These separate machine learning models are employed during a late fusion scheme of the multimodal machine learning environment, where the late fusion scheme represents late fusing of the sensor data and the human labeler data.

Further, in one embodiment, when dealing with separate machine learning models, scoring logic 211 is triggered to obtain a first score from the first machine learning model associated with the sensor data, and a second score from the second machine learning model associated with the human labeler data. These first and second scores are then averaged by scoring logic 211 and then maintains the average of the first and second scores at database(s) 225 to then be used with and applied to any subsequent trainings of the separate machine learning models.

It is contemplated that embodiments are not limited to any number or type of microphone(s) 241, camera(s) 243, speaker(s) 243, display(s) 244, etc. For example, as facilitated by detection and monitoring logic 201, one or more of microphone(s) 241 may be used to detect speech or sound simultaneously from users, such as speakers. Similarly, as facilitated by detection and monitoring logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or video streams.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

Further, input component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", "programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "human labeler", "human labeler data", "sensor data", "labeled sensor data", "classified sensor data", "behavior", "variable", "machine learning interface", "machine learning model", "neural network", "creating", "training", "inferencing", "classifying", "scoring", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from human labeler mechanism 110 to facilitate various embodiments including adding, removing, and/or enhancing certain features. For brevity, clarity, and ease of understanding of human labeler mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

Figure 3A:
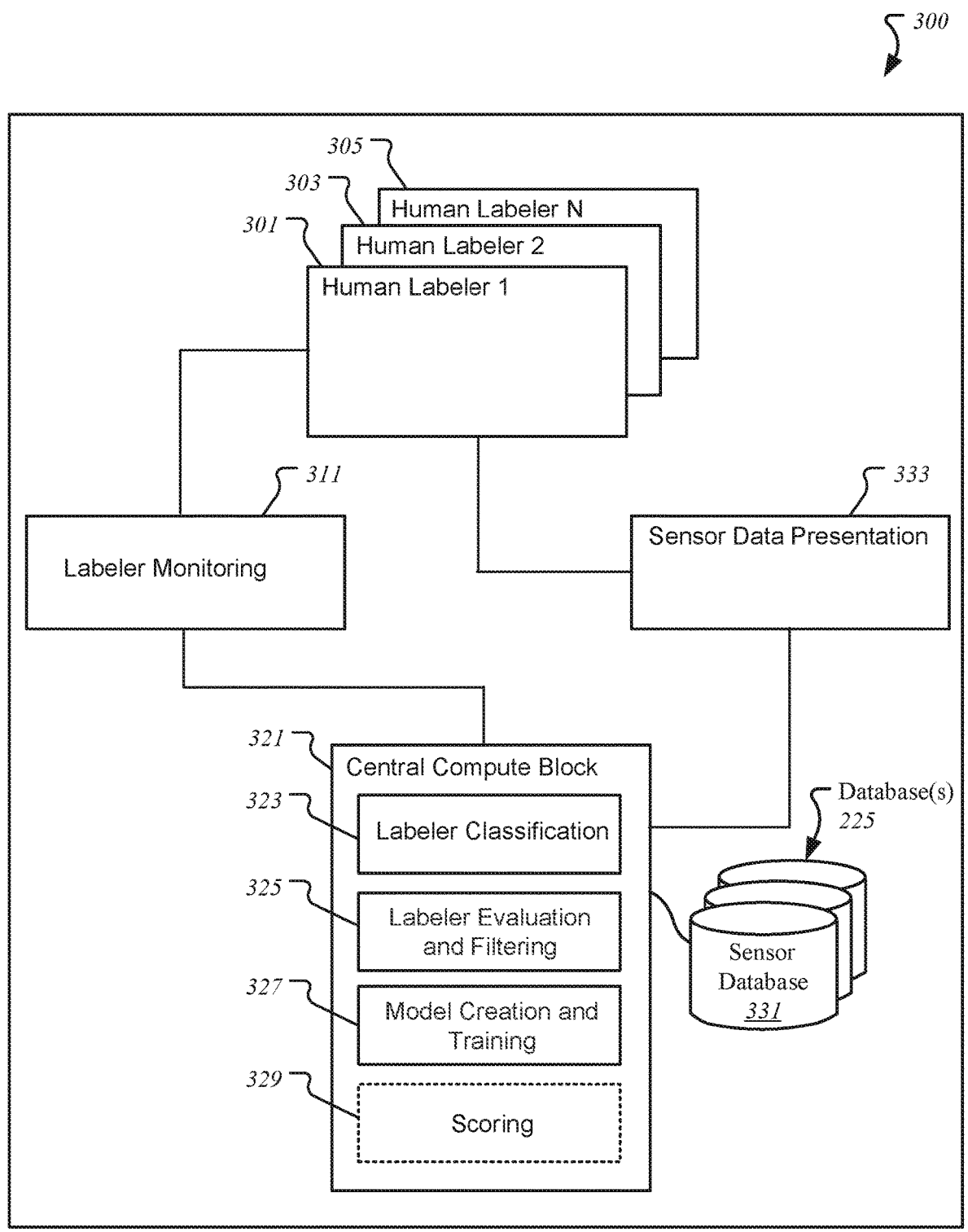
FIG. 3A illustrates a transaction sequence for embedding human labeler influence in machine learning models according to one embodiment.

FIG. 3A illustrates an embodiment of a system 300 for embedding human labeler influence in machine learning models according to one embodiment. For brevity, many of the details previously discussed with reference to FIGS. 1-2 may not be discussed or repeated hereafter. Any processes or transactions with this and other illustrations may be performed by processing logic that may comprise hardware (e.g., circuitry, dedicated logic, programmable logic, etc.), software (such as instructions run on a processing device), or a combination thereof, as facilitated by human labeler mechanism 110 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As illustrated, human labeler data, such as human labelers 1 301, 2 303, N 305, are detected, observed, and monitored at 311 as facilitated by detection and monitoring logic 201 of FIG. 2. Any information associated with these human labelers 301, 303, 305 is then forwarded on to central computation block 321 where the information is processed through labeler classification 323, labeler evaluation and filtering 325, model creation and training 327 as facilitated by classification logic 203, evaluation and filtering logic 205, and model creation and training logic 207, respectively, of FIG. 2. Further, in some embodiments, scoring may also be performed at scoring 329 as facilitated by scoring logic 211 of FIG. 2.

For example, as previously described with reference to FIG. 2, human labeler data is evaluated using sensor data to determine human behavior and/or variables associated with the human labeler data through labeler classification 323 of processing as facilitated by classification logic 203 of FIG. 2, where such human behavior and/or variables are then evaluated for keeping or filtering through labeler evaluation and filtering 325 as facilitated by evaluation and filtering logic 205 of FIG. 2. This evaluated information is then used to create and/or train machine learning models and/or deep learning neural networks using at model creation and training 327 of processing at central compute 321 as facilitated by model creation and training logic 207 of FIG. 2. Further, in some embodiments, such as in case of late fusion processing, scoring of the outcomes from the models/networks may be performed at scoring 329 as facilitated by scoring logic 211 of FIG. 2.

As further illustrated, central computation block 321 may be in communication with database(s) 225 including sensor database 331 for having and maintaining labeler and other relevant data for central compute to access and process as facilitated by human labeler mechanism 110 of FIG. 1. Further, this sensor data at sensor database 331 may be captured or obtained through one or more I/O sources 108, such as microphone(s) 241 for capturing audios (e.g., sound, noise, etc.), camera(s) 242 for capturing visuals (e.g., still images, videos, etc.), etc., of FIG. 2, as facilitated by detection and monitoring logic 201. This sensor data is then processed and classified based on the human labeler data obtained through human labelers 1 301, 2 303, N 305 and sent for senor data presentation 333 where the sensor data is processed to be presented back to the user of a computing device through one or more display device(s) 244 of FIG. 2.

Figure 3B:
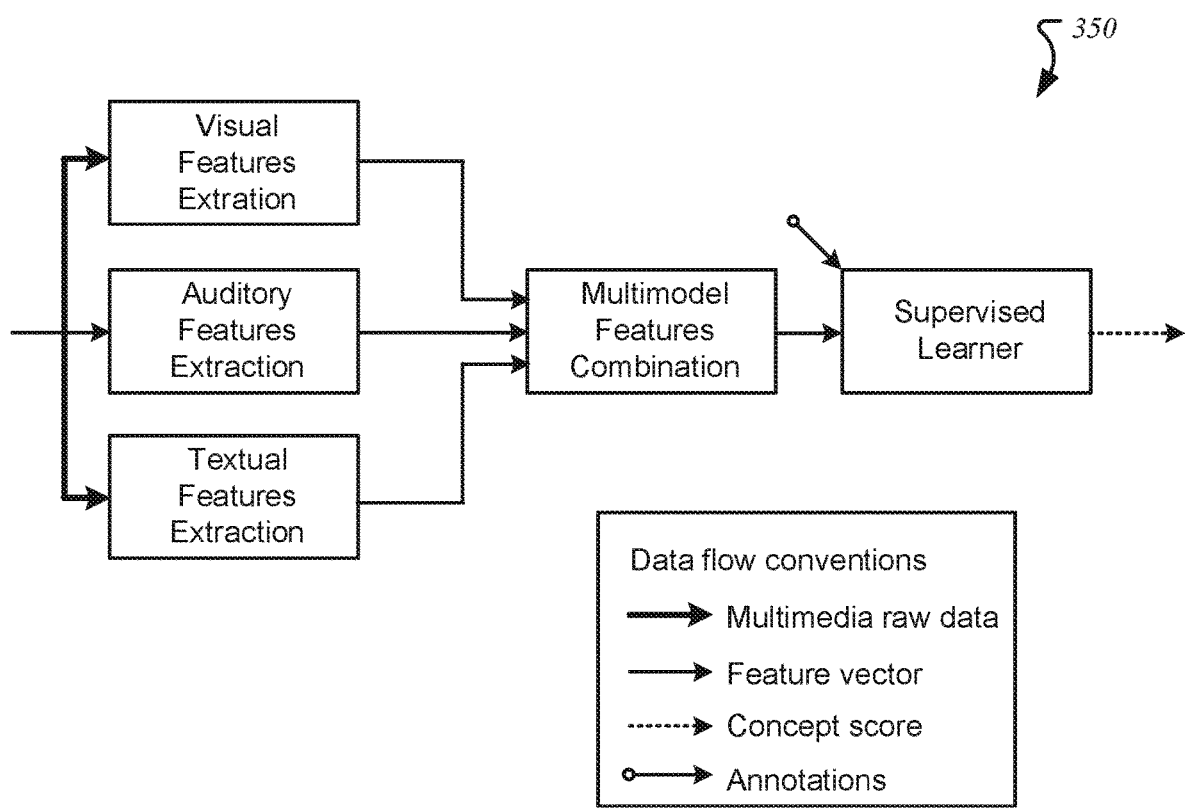
FIG. 3B illustrates a conventional early fusion scheme.

FIG. 3B illustrates a conventional early fusion scheme 350. As illustrated and described earlier with reference to FIG. 2, in early fusion, the output of unimodal analysis is fused before a concept is learned. As illustrated, visual features extraction, auditory features extraction, and textual features extraction are formed into a multimodal features combination, followed by supervised learning.

Figure 3C:
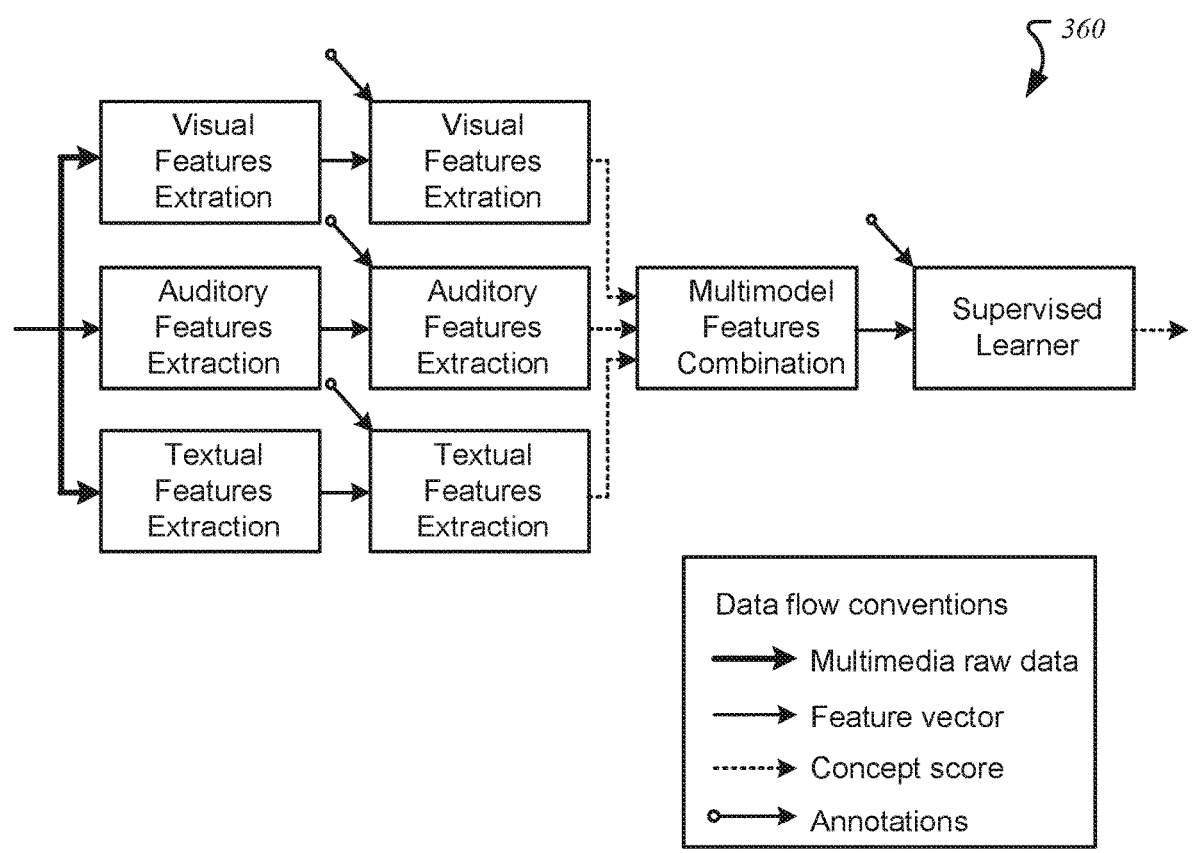
FIG. 3C illustrates a conventional late fusion scheme.

FIG. 3C illustrates a conventional late fusion scheme 360. As illustrated and described earlier with reference to FIG. 2, in late fusion, the output of unimodal analysis is used to learn separate scores for a concept, where a final score for the concept is learned after the fusion. As illustrated, visual features extraction, auditory features extraction, are textual features extraction continue on until formed into a multimodal features combination, followed by supervised learning.

Figure 4A:
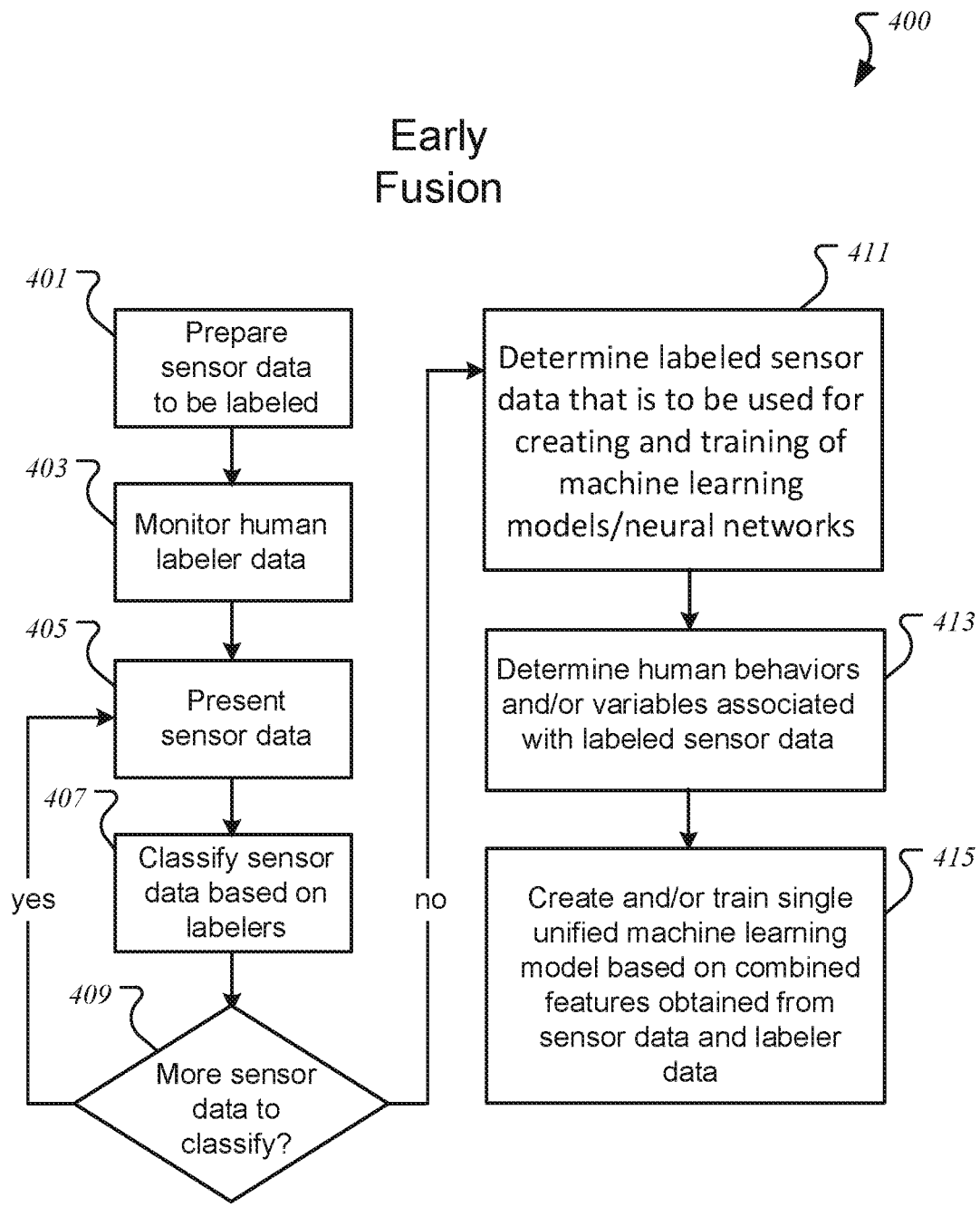
FIG. 4A illustrates an embodiment of a method for an early fusion-based embedding of human labeler influence in machine learning models and/or networks according to one embodiment.

FIG. 4A illustrates an embodiment of a method 400 for an early fusion-based embedding of human labeler influence in machine learning models/networks according to one embodiment. For brevity, many of the details previously discussed with reference to FIGS. 1-3C may not be discussed or repeated hereafter. Any processes or transactions with this and other illustrations may be performed by processing logic that may comprise hardware (e.g., circuitry, dedicated logic, programmable logic, etc.), software (such as instructions run on a processing device), or a combination thereof, as facilitated by human labeler mechanism 110 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As described with reference to early fusion scheme 350 of FIG. 3B, in early, fusion, the output of unimodal analysis is fused before a concept is learned. In the illustrated embodiment of FIG. 4A, method 400 begins at block 401 with preparation for labeling of sensor data associated with a user and obtained through microphones, cameras, etc., of a computing device. At block 403, monitoring of human labeler data is initiated, where the human labeler data may be obtained through sensors (e.g., cameras, microphones, etc.), historical data, categorical data, user personal profiles, etc. At block 405, sensor data is presented for labeling as well as to the user, such as through one or more display devices or screens embedded in or coupled to the computing device. At block 407, human labeler data are used to classify the sensor data to be meaningful for the purposes of machine learning models, neural networks, etc.

At block 409, a determination is made as to whether more sensor data is to be classified using the labelers. For example, in some cases, the sensor data or its classification may not be enough to make sense or meaning of the corresponding human actions and thus if additional classification is needed or could be helpful, then method 400 continues from presentation of the sensor data at block 405. If, however, all the necessary sensor data has been classified, then method 400 continues with choosing of the labeled sensor data to be used for determination of human behavior and other variables to be used in creating and training a machine learning model at block 411. At block 413, human labeler behavior and/or variables are determined. At block 415, in one embodiment, a unified model is created and subsequently trained with combined features from sensor data and labeler data.

Figure 4B:
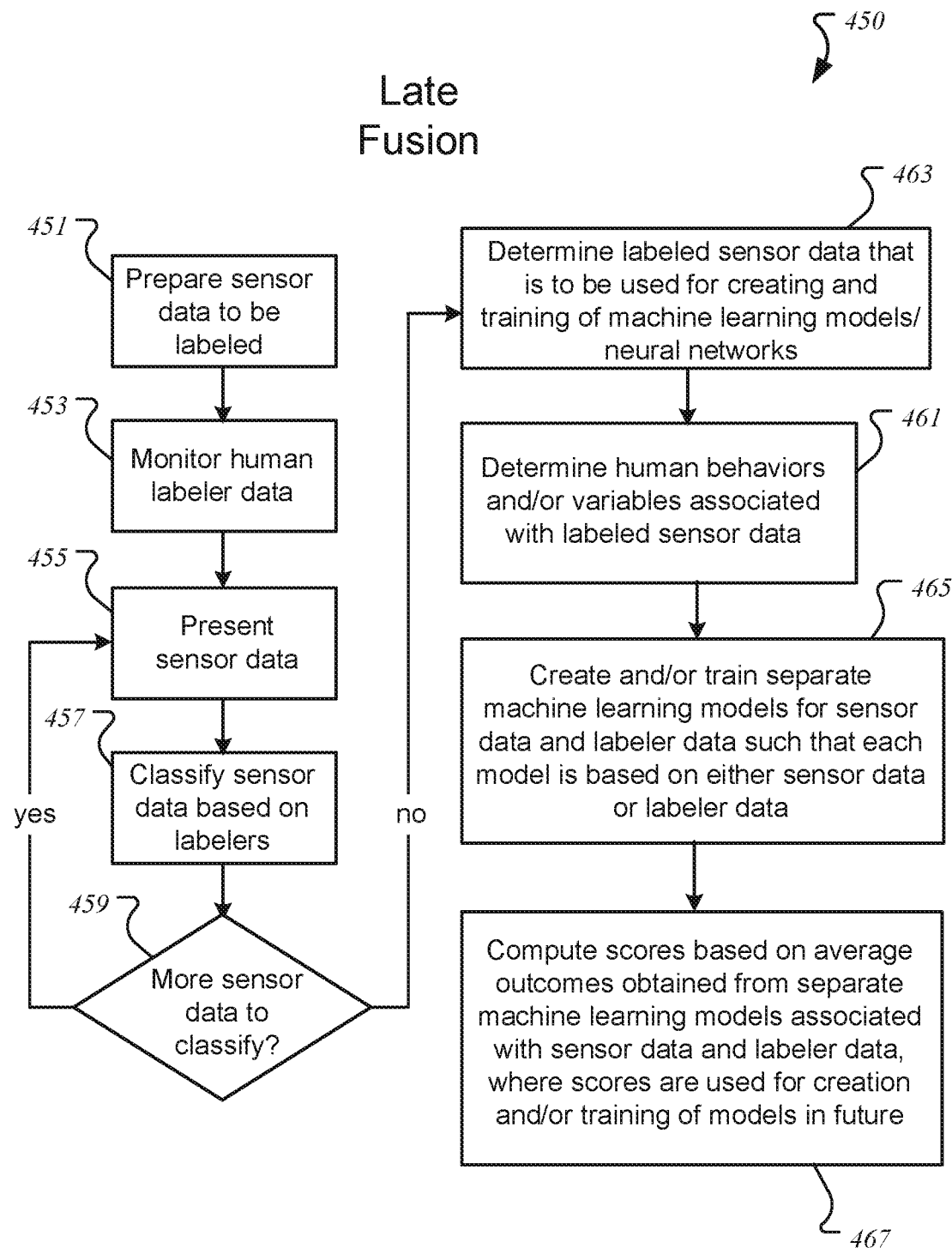
FIG. 4B illustrates an embodiment of a method for a late fusion-based embedding of human labeler influence in machine learning models and/or networks according to one embodiment.

FIG. 4B illustrates an embodiment of a method 450 for a late fusion-based embedding of human labeler influence in machine learning models/networks according to one embodiment. For brevity, many of the details previously discussed with reference to FIGS. 1-4A may not be discussed or repeated hereafter. Any processes or transactions with this and other illustrations may be performed by processing logic that may comprise hardware (e.g., circuitry, dedicated logic, programmable logic, etc.), software (such as instructions run on a processing device), or a combination thereof, as facilitated by human labeler mechanism 110 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As described with reference to conventional late fusion scheme 360 of FIG. 3B. As illustrated, in late fusion, the output of unimodal analysis is used to learn separate scores for a concept, where a final score for the concept is learned after the fusion. As illustrated with reference to FIG. 4A, method 450 begins at block 451 with sensor data being prepared for labeling, while at block 453, human labeler monitoring is initiated. At block 455, sensor data is presented for labeling as well as to the user, such as through one or more display devices or screens embedded in or coupled to the computing device. At block 457, human labelers are used to classify the sensor data to be meaningful for the purposes of machine learning models, neural networks, etc.

At block 459, a determination is made as to whether more sensor data is to be classified using the labelers. For example, in some cases, the sensor data or its classification may not be enough to make sense or meaning of the corresponding human actions and thus if additional classification is needed or could be helpful, then method 450 continues from presentation of the sensor data at block 455. If, however, all the necessary sensor data has been classified, then method 450 continues with choosing of the labeled sensor data to be used for determination of human behavior and other variables to be used in creating and training a machine learning model at block 461. At block 463, human labeler behavior and/or variables are determined. At block 465, in one embodiment, multiple and separate machine learning models created and subsequently trained for features from sensor data and labeler data, respectively. For example, as opposed to the unified model of FIG. 4A, here, at block 465, each of the two sets of data, such as sensor data and labeler data, is assigned a model for training purposes. Further, in one embodiment, at block 467, scores are determined based on averaging the outcomes that are obtained through sensor data and labeler data models. For example, a score may indicate, on average, a likelihood of an interpretation of a human behavior based on the human labeler and/or sensor data, where such scores may be saved one or more databases for future access and use so that the entire process does not have to be repeated.

Figure 5:
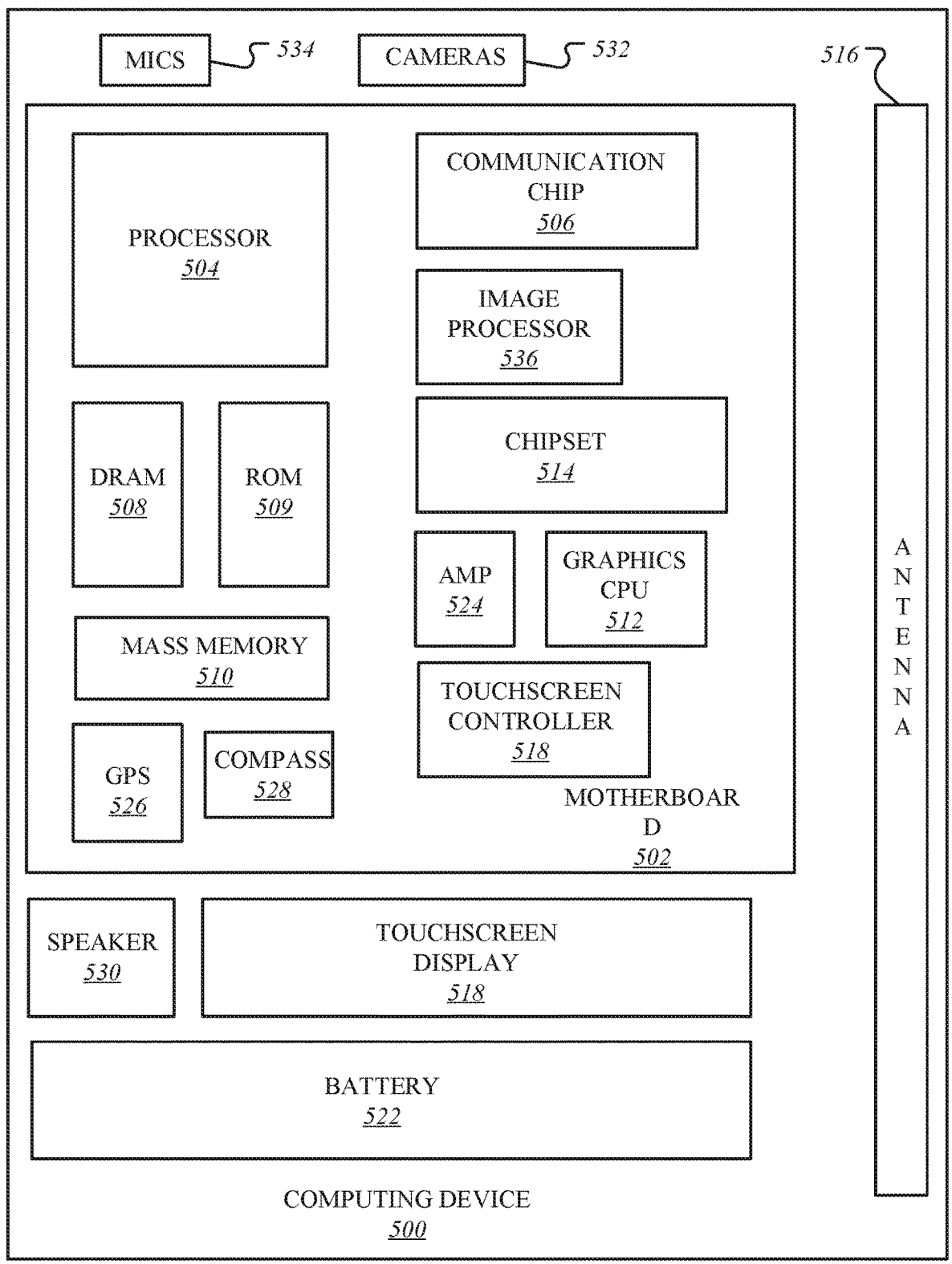
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
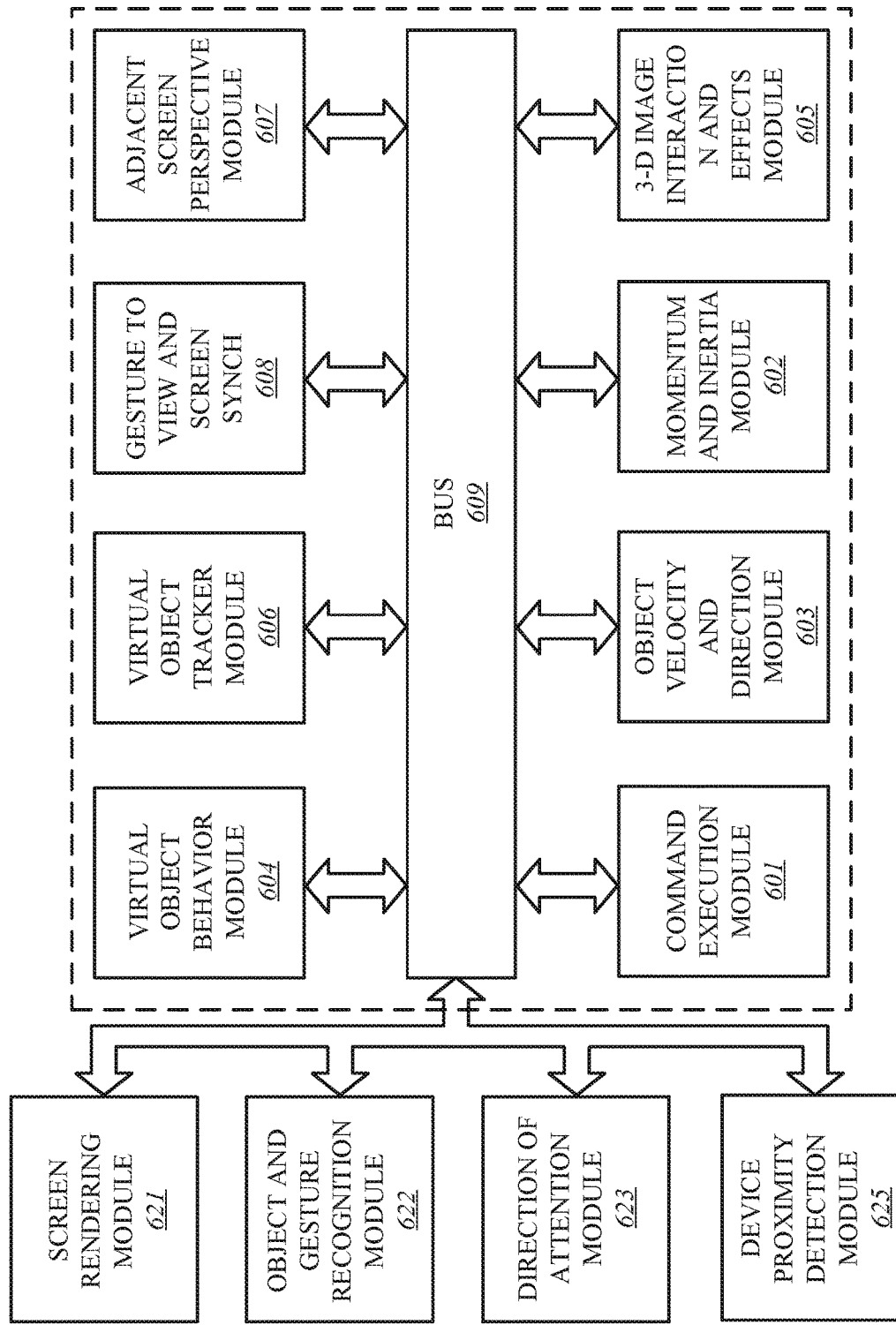
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

Figure 7:
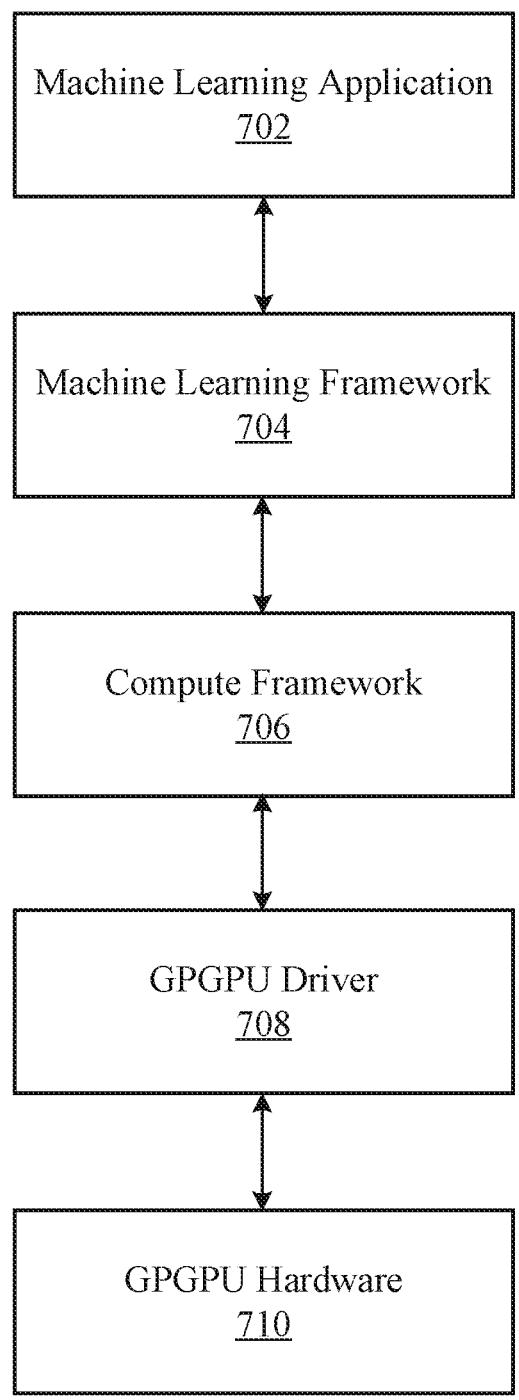
FIG. 7 illustrates a machine learning software stack according to one embodiment.

FIG. 7 is a generalized diagram of a machine learning software stack 700. Although FIG. 7 illustrates a software stack for general-purpose GPU (GPGPU) operations, a machine learning software stack is not limited to this example and may include, for also, a machine learning software stack for CPU operations. A machine learning application 702 can be configured to train a neural network using a training dataset or to use a trained deep neural network to implement machine intelligence. The machine learning application 702 can include training and inference functionality for a neural network and/or specialized software that can be used to train a neural network before deployment. The machine learning application 702 can implement any type of machine intelligence including but not limited to image recognition, mapping and localization, autonomous navigation, speech synthesis, medical imaging, or language translation.

Hardware acceleration for the machine learning application 702 can be enabled via a machine learning framework 704. The machine learning framework 704 can provide a library of machine learning primitives. Machine learning primitives are basic operations that are commonly performed by machine learning algorithms Without the machine learning framework 704, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 704. Exemplary primitives include tensor convolutions, activation functions, and pooling, which are computational operations that are performed while training a convolutional neural network (CNN). The machine learning framework 704 can also provide primitives to implement basic linear algebra subprograms performed by many machine-learning algorithms, such as matrix and vector operations.

The machine learning framework 704 can process input data received from the machine learning application 702 and generate the appropriate input to a compute framework 706. The compute framework 706 can abstract the underlying instructions provided to the GPGPU driver 708 to enable the machine learning framework 704 to take advantage of hardware acceleration via the GPGPU hardware 710 without requiring the machine learning framework 704 to have intimate knowledge of the architecture of the GPGPU hardware 710. Additionally, the compute framework 706 can enable hardware acceleration for the machine learning framework 704 across a variety of types and generations of the GPGPU hardware 710.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 8A:
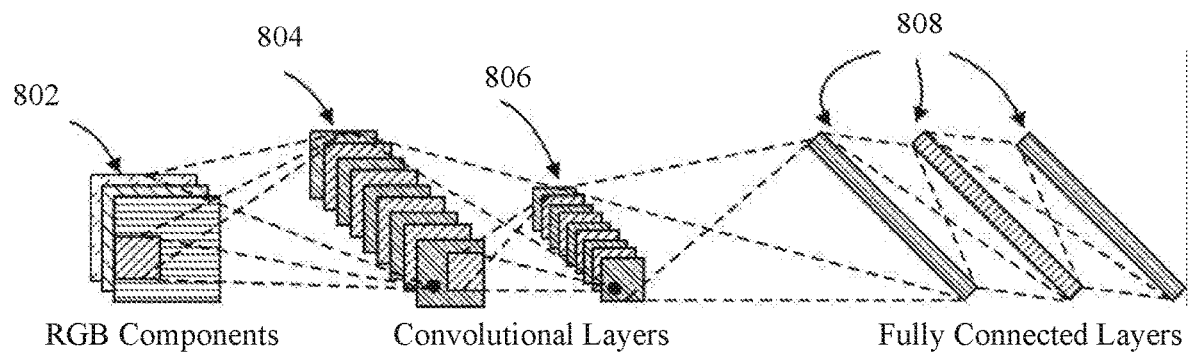
FIG. 8A illustrates neural network layers according to one embodiment.
Figure 8B:
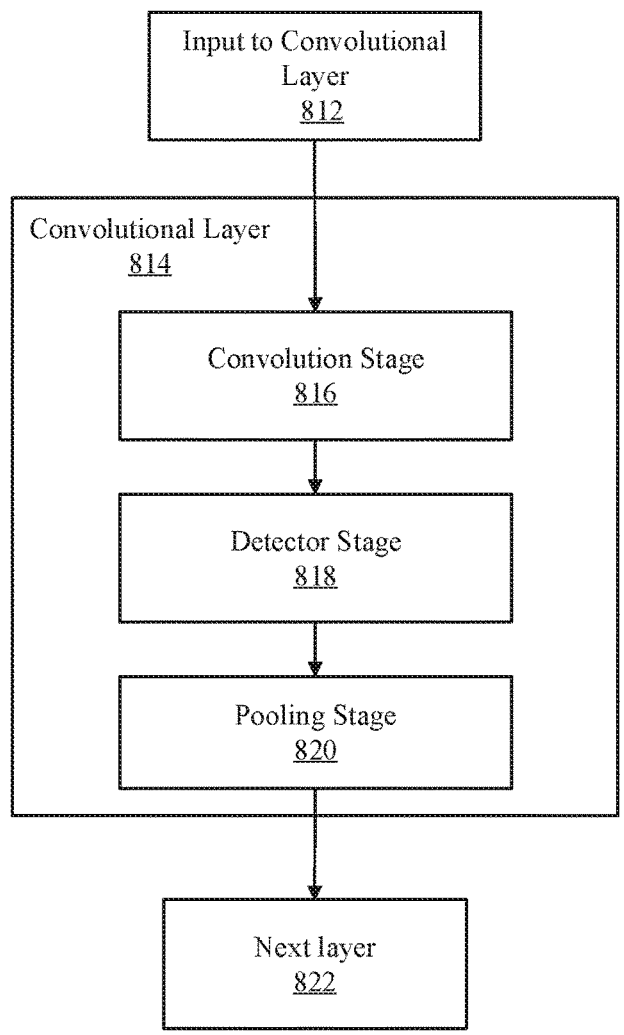
FIG. 8B illustrates computation stages associated with neural network layers according to one embodiment.

FIGS. 8A-8B illustrate an exemplary convolutional neural network. FIG. 8A illustrates various layers within a CNN. As shown in FIG. 8A, an exemplary CNN used to model image processing can receive input 802 describing the red, green, and blue (RGB) components of an input image. The input 802 can be processed by multiple convolutional layers (e.g., first convolutional layer 804, second convolutional layer 806). The output from the multiple convolutional layers may optionally be processed by a set of fully connected layers 808. Neurons in a fully connected layer have full connections to all activations in the previous layer, as previously described for a feedforward network. The output from the fully connected layers 808 can be used to generate an output result from the network. The activations within the fully connected layers 808 can be computed using matrix multiplication instead of convolution. Not all CNN implementations are make use of fully connected layers 808. For example, in some implementations the second convolutional layer 806 can generate output for the CNN.

The convolutional layers are sparsely connected, which differs from traditional neural network configuration found in the fully connected layers 808. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 8B illustrates exemplary computation stages within a convolutional layer of a CNN. Input to a convolutional layer 812 of a CNN can be processed in three stages of a convolutional layer 814. The three stages can include a convolution stage 816, a detector stage 818, and a pooling stage 820. The convolution layer 814 can then output data to a successive convolutional layer. The final convolutional layer of the network can generate output feature map data or provide input to a fully connected layer, for example, to generate a classification value for the input to the CNN.

In the convolution stage 816 performs several convolutions in parallel to produce a set of linear activations. The convolution stage 816 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 816 defines a set of linear activations that are processed by successive stages of the convolutional layer 814.

The linear activations can be processed by a detector stage 818. In the detector stage 818, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 820 uses a pooling function that replaces the output of the second convolutional layer 806 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 820, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 814 can then be processed by the next layer 822. The next layer 822 can be an additional convolutional layer or one of the fully connected layers 808. For example, the first convolutional layer 804 of FIG. 8A can output to the second convolutional layer 806, while the second convolutional layer can output to a first layer of the fully connected layers 808.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate embedding of human labeler influences in machine learning interfaces in computing environments, the apparatus comprising: one or more processors to: classify sensor data with human labeler data, where the sensor data is obtained through one or more sensors; and create and train a unified machine learning model based on features associated with the classified sensor data based on the human labeler data, wherein the features include human labeler influences as obtained from the human labeler data in associated with the sensor data.

Example 2 includes the subject matter of Example 1, wherein the one or more processors are further to: detect the sensor data through the one or more sensors including one or more of a camera, a microphone, a touch sensor, a capacitor, a radio component, a radar component, a scanner, and an accelerometer; and monitoring the human labeler data to determine one or more of human behaviors and human variables, wherein the human labeler data is obtained through multiple sources including one or more of the one or more sensors, historical data, categorical data, and personal profiles.

Example 3 includes the subject matter of Examples 1-2, wherein the one or more processors are further to prior to classifying the sensor data, evaluate the human behaviors and human variables and their association with the sensor data.

Example 4 includes the subject matter of Examples 1-3, wherein the one or more processors are further to filter out one or more of the human variables associated with one or more of inaccuracies, unintended consequences, and biases, wherein the filtered out one or more human variables include one or more of age, gender, race, ethnicity, national origin, religion, and sexual orientation, and wherein the filtered out one or more human variables further include one or more of accidental acts and coincidental items, wherein the one or more processors are further to recognize and consider one or more variances between first human variables and second human variables in application of the first and second human variables in training the machine learning model.

Example 5 includes the subject matter of Examples 1-4, wherein the unified machine learning model is created and trained in an early fusion machine learning environment.

Example 6 includes the subject matter of Examples 1-5, wherein the one or more processors are further to create and train multiple machine learning models such that each of the multiple machine learning models is based on first features of the features associated with the sensor data or second features of the features associated with human labeler data.

Example 7 includes the subject matter of Examples 1-6, wherein the one or more processors are further to compute scores based on average outcomes obtained from the multiple machine learning models associated with the sensor data and the human labeler data, wherein the scores are maintained in one or more databases to be used with creation and training of future machine learning models, wherein the one or more processors comprise one or more of a graphics processor and an application processor, wherein the graphics processor and the application processor are co-located on a common semiconductor package.

Some embodiments pertain to Example 8 that includes a method facilitating embedding of human labeler influences in machine learning interfaces in computing environments, the method comprising: classifying sensor data with human labeler data, where the sensor data is obtained through one or more sensors; and creating and training a unified machine learning model based on features associated with the classified sensor data based on the human labeler data, wherein the features include human labeler influences as obtained from the human labeler data in associated with the sensor data.

Example 9 includes the subject matter of Example 8, further comprising: detecting the sensor data through the one or more sensors including one or more of a camera, a microphone, a touch sensor, a capacitor, a radio component, a radar component, a scanner, and an accelerometer; and monitoring the human labeler data to determine one or more of human behaviors and human variables, wherein the human labeler data is obtained through multiple sources including one or more of the one or more sensors, historical data, categorical data, and personal profiles.

Example 10 includes the subject matter of Examples 8-9, further comprising prior to classifying the sensor data, evaluate the human behaviors and human variables and their association with the sensor data.

Example 11 includes the subject matter of Examples 8-10, further comprising: filtering out one or more of the human variables associated with one or more of inaccuracies, unintended consequences, and biases, wherein the filtered out one or more human variables include one or more of age, gender, race, ethnicity, national origin, religion, and sexual orientation, and wherein the filtered out one or more human variables further include one or more of accidental acts and coincidental items; and recognizing and considering one or more variances between first human variables and second human variables in application of the first and second human variables in training the machine learning model.

Example 12 includes the subject matter of Examples 8-11, wherein the unified machine learning model is created and trained in an early fusion machine learning environment.

Example 13 includes the subject matter of Examples 8-12, further comprising creating and training multiple machine learning models such that each of the multiple machine learning models is based on first features of the features associated with the sensor data or second features of the features associated with human labeler data.

Example 14 includes the subject matter of Examples 8-13, further comprising computing scores based on average outcomes obtained from the multiple machine learning models associated with the sensor data and the human labeler data, wherein the scores are maintained in one or more databases to be used with creation and training of future machine learning models, wherein the method is facilitated by one or more processors comprising one or more of a graphics processor and an application processor, wherein the graphics processor and the application processor are co-located on a common semiconductor package.

Some embodiments pertain to Example 15 that includes a data processing system comprising a processing device coupled to memory, the processing device to: classify sensor data with human labeler data, where the sensor data is obtained through one or more sensors; and create and train a unified machine learning model based on features associated with the classified sensor data based on the human labeler data, wherein the features include human labeler influences as obtained from the human labeler data in associated with the sensor data.

Example 16 includes the subject matter of Example 15, wherein the processing device to: detect the sensor data through the one or more sensors including one or more of a camera, a microphone, a touch sensor, a capacitor, a radio component, a radar component, a scanner, and an accelerometer; and monitor the human labeler data to determine one or more of human behaviors and human variables, wherein the human labeler data is obtained through multiple sources including one or more of the one or more sensors, historical data, categorical data, and personal profiles.

Example 17 includes the subject matter of Examples 15-16, wherein the processing device to prior to classifying the sensor data, evaluate the human behaviors and human variables and their association with the sensor data.

Example 18 includes the subject matter of Examples 15-17, wherein the processing device to: filter out one or more of the human variables associated with one or more of inaccuracies, unintended consequences, and biases, wherein the filtered out one or more human variables include one or more of age, gender, race, ethnicity, national origin, religion, and sexual orientation, and wherein the filtered out one or more human variables further include one or more of accidental acts and coincidental items; and recognize and consider one or more variances between first human variables and second human variables in application of the first and second human variables in training the machine learning model.

Example 19 includes the subject matter of Examples 15-18, wherein the unified machine learning model is created and trained in an early fusion machine learning environment.

Example 20 includes the subject matter of Examples 15-19, wherein the processing device to create and train multiple machine learning models such that each of the multiple machine learning models is based on first features of the features associated with the sensor data or second features of the features associated with human labeler data.

Example 21 includes the subject matter of Examples 15-20, wherein the processing device to compute scores based on average outcomes obtained from the multiple machine learning models associated with the sensor data and the human labeler data, wherein the scores are maintained in one or more databases to be used with creation and training of future machine learning models, wherein the processing device comprise one or more of a graphics processor and an application processor, wherein the graphics processor and the application processor are co-located on a common semiconductor package.

Some embodiments pertain to Example 22 that includes an apparatus facilitating embedding of human labeler influences in machine learning interfaces in computing environments, the apparatus comprising: means for classifying sensor data with human labeler data, where the sensor data is obtained through one or more sensors; and means for creating and training a unified machine learning model based on features associated with the classified sensor data based on the human labeler data, wherein the features include human labeler influences as obtained from the human labeler data in associated with the sensor data.

Example 23 includes the subject matter of Example 22, further comprising: means for detecting the sensor data through the one or more sensors including one or more of a camera, a microphone, a touch sensor, a capacitor, a radio component, a radar component, a scanner, and an accelerometer; and means for monitoring the human labeler data to determine one or more of human behaviors and human variables, wherein the human labeler data is obtained through multiple sources including one or more of the one or more sensors, historical data, categorical data, and personal profiles.

Example 24 includes the subject matter of Examples 22-23, further comprising prior to classifying the sensor data, means for evaluating the human behaviors and human variables and their association with the sensor data.

Example 25 includes the subject matter of Examples 22-24, further comprising: means for filtering out one or more of the human variables associated with one or more of inaccuracies, unintended consequences, and biases, wherein the filtered out one or more human variables include one or more of age, gender, race, ethnicity, national origin, religion, and sexual orientation, and wherein the filtered out one or more human variables further include one or more of accidental acts and coincidental items; and means for recognizing and considering one or more variances between first human variables and second human variables in application of the first and second human variables in training the machine learning model.

Example 26 includes the subject matter of Examples 22-25, wherein the unified machine learning model is created and trained in an early fusion machine learning environment.

Example 27 includes the subject matter of Examples 22-26, further comprising means for creating and means for training multiple machine learning models such that each of the multiple machine learning models is based on first features of the features associated with the sensor data or second features of the features associated with human labeler data.

Example 28 includes the subject matter of Examples 22-27, further comprising means for computing scores based on average outcomes obtained from the multiple machine learning models associated with the sensor data and the human labeler data, wherein the scores are maintained in one or more databases to be used with creation and training of future machine learning models, wherein the processing device comprise one or more of a graphics processor and an application processor, wherein the graphics processor and the application processor are co-located on a common semiconductor package.

Some embodiments pertain to Example 29 that includes an apparatus to facilitate embedding of human labeler influences in machine learning interfaces in computing environments, the apparatus comprising: one or more processors to: detect sensor data via one or more sensors of a computing device; access human labeler data at one or more databases coupled to the computing device; evaluate relevance between the sensor data and the human labeler data, wherein the relevance identifies meaning of the sensor data based on human behavior corresponding to the human labeler data; associate, based on the relevance, human labeler data with the sensor data to classify the sensor data as labeled data; and training, based on the labeled data, a machine learning model to extract human influences from the labeled data, and embed one or more of the human influences in one or more environments representing one or more physical scenarios involving one or more humans.

Example 30 includes the subject matter of Example 29, wherein the one or more processors are further to facilitate the machine learning model to interpret, based on the labeled data, the human influences according to multiple environments prior to embedding the one or more human influences in the one or more environments, wherein the interpretation of the human influences is based on acceptances of the human behavior and exceptions to the human behavior as derived from the labeled data and based on the relevance, wherein the acceptances of the human behavior are based on verified data obtained from one or more of personal profiles, cultural traits, historical norms, societal preferences, personal prejudices, societal biases, habits, and wherein the exceptions to the human behavior are based on unverified data obtained from one or more of coincidences, accidents, inaccuracies, flukes, and unintended consequences, wherein one or more of the human behaviors are filtered out based on one or more of the exceptions to avoid associating inaccuracies to the human influences.

Example 31 includes the subject matter of Examples 29-30, wherein the relevance is further based on a human-variables portion of the human behavior, wherein the human-variables portion is based on human variables that incite personal prejudices or the societal biases, wherein the human variables include one or more of age, gender, race, ethnicity, national origin, political affiliation, religious association, and sexual orientation.

Example 32 includes the subject matter of Examples 29-31, wherein the machine learning model includes a unified machine learning model based on the sensor data and the human labeler data, wherein the unified machine learning model is employed during an early fusion scheme of a multimodal machine learning environment, wherein the early fusion scheme represents early fusing of the sensor data and the human labeler data.

Example 33 includes the subject matter of Examples 29-32, wherein the machine learning model includes separate machine learning models, wherein a first machine learning model of the separate machine learning models is based on the sensor data and not the human labeler data, wherein a second machine learning model of the separate machine learning models is based on the human labeler data and not the sensor data, and wherein the separate machine learning models are employed during a late fusion scheme of the multimodal machine learning environment, wherein the late fusion scheme represents late fusion of the sensor data and the human labeler data.

Example 34 includes the subject matter of Examples 29-33, wherein the one or more processors are further to: obtain a first score from the first machine learning model associated with the sensor data; obtain a second score from the second machine learning model associated with the human labeler data; and average the first and second scores; and maintaining the averaged first and second scores at the one or more databases to be applied to subsequent trainings of the separate machine learning models.

Example 35 includes the subject matter of Examples 29-34, wherein the one or more processors comprise one or more of a graphics processor and an application processor, wherein the graphics processor and the application processor are co-located on a common semiconductor package, and wherein the one or more sensors include one or more of a camera, a microphone, a touch sensor, a capacitor, a radio component, a radar component, a scanner, and an accelerometer.

Some embodiments pertain to Example 36 that includes a method for facilitating embedding of human labeler influences in machine learning interfaces in computing environments, the method comprising: detecting sensor data via one or more sensors of a computing device; accessing human labeler data at one or more databases coupled to the computing device; evaluating relevance between the sensor data and the human labeler data, wherein the relevance identifies meaning of the sensor data based on human behavior corresponding to the human labeler data; associating, based on the relevance, human labeler data with the sensor data to classify the sensor data as labeled data; and training, based on the labeled data, a machine learning model to extract human influences from the labeled data, and embed one or more of the human influences in one or more environments representing one or more physical scenarios involving one or more humans.

Example 37 includes the subject matter of Example 36, wherein training is further to facilitate the machine learning model to interpret, based on the labeled data, the human influences according to multiple environments prior to embedding the one or more human influences in the one or more environments, wherein the interpretation of the human influences is based on acceptances of the human behavior and exceptions to the human behavior as derived from the labeled data and based on the relevance, wherein the acceptances of the human behavior are based on verified data obtained from one or more of personal profiles, cultural traits, historical norms, societal preferences, personal prejudices, societal biases, habits, and wherein the exceptions to the human behavior are based on unverified data obtained from one or more of coincidences, accidents, inaccuracies, flukes, and unintended consequences, wherein one or more of the human behaviors are filtered out based on one or more of the exceptions to avoid associating inaccuracies to the human influences.

Example 38 includes the subject matter of Examples 36-37, wherein the relevance is further based on a human-variables portion of the human behavior, wherein the human-variables portion is based on human variables that incite personal prejudices or the societal biases, wherein the human variables include one or more of age, gender, race, ethnicity, national origin, political affiliation, religious association, and sexual orientation.

Example 39 includes the subject matter of Examples 36-38, wherein the machine learning model includes a unified machine learning model based on the sensor data and the human labeler data, wherein the unified machine learning model is employed during an early fusion scheme of a multimodal machine learning environment, wherein the early fusion scheme represents early fusing of the sensor data and the human labeler data.

Example 40 includes the subject matter of Examples 36-39, wherein the machine learning model includes separate machine learning models, wherein a first machine learning model of the separate machine learning models is based on the sensor data and not the human labeler data, wherein a second machine learning model of the separate machine learning models is based on the human labeler data and not the sensor data, and wherein the separate machine learning models are employed during a late fusion scheme of the multimodal machine learning environment, wherein the late fusion scheme represents late fusion of the sensor data and the human labeler data.

Example 41 includes the subject matter of Examples 36-40, further comprising: obtaining a first score from the first machine learning model associated with the sensor data; obtaining a second score from the second machine learning model associated with the human labeler data; averaging the first and second scores; and maintaining the averaged first and second scores at the one or more databases to be applied to subsequent trainings of the separate machine learning models.

Example 42 includes the subject matter of Examples 36-41, wherein the method is facilitated by one or more processors comprising one or more of a graphics processor and an application processor, wherein the graphics processor and the application processor are co-located on a common semiconductor package, and wherein the one or more sensors include one or more of a camera, a microphone, a touch sensor, a capacitor, a radio component, a radar component, a scanner, and an accelerometer.

Some embodiments pertain to Example 43 that includes a data processing system comprising a processing device coupled to memory, the processing device to: detect sensor data via one or more sensors of a computing device; access human labeler data at one or more databases coupled to the computing device; evaluate relevance between the sensor data and the human labeler data, wherein the relevance identifies meaning of the sensor data based on human behavior corresponding to the human labeler data; associate, based on the relevance, human labeler data with the sensor data to classify the sensor data as labeled data; and train, based on the labeled data, a machine learning model to extract human influences from the labeled data, and embed one or more of the human influences in one or more environments representing one or more physical scenarios involving one or more humans.

Example 44 includes the subject matter of Example 43, wherein the processing device is further to facilitate the machine learning model to interpret, based on the labeled data, the human influences according to multiple environments prior to embedding the one or more human influences in the one or more environments, wherein the interpretation of the human influences is based on acceptances of the human behavior and exceptions to the human behavior as derived from the labeled data and based on the relevance, wherein the acceptances of the human behavior are based on verified data obtained from one or more of personal profiles, cultural traits, historical norms, societal preferences, personal prejudices, societal biases, habits, and wherein the exceptions to the human behavior are based on unverified data obtained from one or more of coincidences, accidents, inaccuracies, flukes, and unintended consequences, wherein one or more of the human behaviors are filtered out based on one or more of the exceptions to avoid associating inaccuracies to the human influences.

Example 45 includes the subject matter of Examples 43-44, wherein the relevance is further based on a human-variables portion of the human behavior, wherein the human-variables portion is based on human variables that incite personal prejudices or the societal biases, wherein the human variables include one or more of age, gender, race, ethnicity, national origin, political affiliation, religious association, and sexual orientation.

Example 46 includes the subject matter of Examples 43-45, wherein the machine learning model includes a unified machine learning model based on the sensor data and the human labeler data, wherein the unified machine learning model is employed during an early fusion scheme of a multimodal machine learning environment, wherein the early fusion scheme represents early fusing of the sensor data and the human labeler data.

Example 47 includes the subject matter of Examples 43-46, wherein the machine learning model includes separate machine learning models, wherein a first machine learning model of the separate machine learning models is based on the sensor data and not the human labeler data, wherein a second machine learning model of the separate machine learning models is based on the human labeler data and not the sensor data, and wherein the separate machine learning models are employed during a late fusion scheme of the multimodal machine learning environment, wherein the late fusion scheme represents late fusion of the sensor data and the human labeler data.

Example 48 includes the subject matter of Examples 43-47, wherein the processing device is further to: obtain a first score from the first machine learning model associated with the sensor data; obtain a second score from the second machine learning model associated with the human labeler data; averaging the first and second scores; and maintain the averaged first and second scores at the one or more databases to be applied to subsequent trainings of the separate machine learning models.

Example 49 includes the subject matter of Examples 43-48, wherein the processing device comprises one or more of a graphics processor and an application processor, wherein the graphics processor and the application processor are co-located on a common semiconductor package, and wherein the one or more sensors include one or more of a camera, a microphone, a touch sensor, a capacitor, a radio component, a radar component, a scanner, and an accelerometer.

Some embodiments pertain to Example 50 that includes an apparatus facilitating embedding of human labeler influences in machine learning interfaces in computing environments, the apparatus comprising: means for detecting sensor data via one or more sensors of a computing device; means for accessing human labeler data at one or more databases coupled to the computing device; means for evaluating relevance between the sensor data and the human labeler data, wherein the relevance identifies meaning of the sensor data based on human behavior corresponding to the human labeler data; means for associating, based on the relevance, human labeler data with the sensor data to classify the sensor data as labeled data; and means for training, based on the labeled data, a machine learning model to extract human influences from the labeled data, and embed one or more of the human influences in one or more environments representing one or more physical scenarios involving one or more humans.

Example 51 includes the subject matter of Example 50, wherein the means for training is further to facilitate the machine learning model to interpret, based on the labeled data, the human influences according to multiple environments prior to embedding the one or more human influences in the one or more environments, wherein the interpretation of the human influences is based on acceptances of the human behavior and exceptions to the human behavior as derived from the labeled data and based on the relevance, wherein the acceptances of the human behavior are based on verified data obtained from one or more of personal profiles, cultural traits, historical norms, societal preferences, personal prejudices, societal biases, habits, and wherein the exceptions to the human behavior are based on unverified data obtained from one or more of coincidences, accidents, inaccuracies, flukes, and unintended consequences, wherein one or more of the human behaviors are filtered out based on one or more of the exceptions to avoid associating inaccuracies to the human influences.

Example 52 includes the subject matter of Examples 50-51, wherein the relevance is further based on a human-variables portion of the human behavior, wherein the human-variables portion is based on human variables that incite personal prejudices or the societal biases, wherein the human variables include one or more of age, gender, race, ethnicity, national origin, political affiliation, religious association, and sexual orientation.

Example 53 includes the subject matter of Examples 50-52, wherein the machine learning model includes a unified machine learning model based on the sensor data and the human labeler data, wherein the unified machine learning model is employed during an early fusion scheme of a multimodal machine learning environment, wherein the early fusion scheme represents early fusing of the sensor data and the human labeler data.

Example 54 includes the subject matter of Examples 50-53, wherein the machine learning model includes separate machine learning models, wherein a first machine learning model of the separate machine learning models is based on the sensor data and not the human labeler data, wherein a second machine learning model of the separate machine learning models is based on the human labeler data and not the sensor data, and wherein the separate machine learning models are employed during a late fusion scheme of the multimodal machine learning environment, wherein the late fusion scheme represents late fusion of the sensor data and the human labeler data.

Example 55 includes the subject matter of Examples 50-54, further comprising: means for obtaining a first score from the first machine learning model associated with the sensor data; means for obtaining a second score from the second machine learning model associated with the human labeler data; means for averaging the first and second scores; and means for maintaining the averaged first and second scores at the one or more databases to be applied to subsequent trainings of the separate machine learning models.

Example 56 includes the subject matter of Examples 50-55, wherein the apparatus comprises one or more processors comprising one or more of a graphics processor and an application processor, wherein the graphics processor and the application processor are co-located on a common semiconductor package, and wherein the one or more sensors include one or more of a camera, a microphone, a touch sensor, a capacitor, a radio component, a radar component, a scanner, and an accelerometer.

Example 57 includes at least one non-transitory or tangible machine-readable medium comprising a plurality of instructions, when executed on a computing device, to implement or perform a method as claimed in any of claims or examples 8-14 or 36-42.

Example 58 includes at least one machine-readable medium comprising a plurality of instructions, when executed on a computing device, to implement or perform a method as claimed in any of claims or examples 8-14 or 36-42.

Example 59 includes a system comprising a mechanism to implement or perform a method as claimed in any of claims or examples 8-14 or 36-42.

Example 60 includes an apparatus comprising means for performing a method as claimed in any of claims or examples 8-14 or 36-42.

Example 61 includes a computing device arranged to implement or perform a method as claimed in any of claims or examples 8-14 or 36-42.

Example 62 includes a communications device arranged to implement or perform a method as claimed in any of claims or examples 8-14 or 36-42.

Example 63 includes at least one machine-readable medium comprising a plurality of instructions, when executed on a computing device, to implement or perform a method or realize an apparatus as claimed in any preceding claims.

Example 64 includes at least one non-transitory or tangible machine-readable medium comprising a plurality of instructions, when executed on a computing device, to implement or perform a method or realize an apparatus as claimed in any preceding claims.

Example 65 includes a system comprising a mechanism to implement or perform a method or realize an apparatus as claimed in any preceding claims.

Example 66 includes an apparatus comprising means to perform a method as claimed in any preceding claims.

Example 67 includes a computing device arranged to implement or perform a method or realize an apparatus as claimed in any preceding claims.

Example 68 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one machine-readable medium comprising instructions which, when executed by a computing device, cause the computing device to perform operations comprising:
    classifying, by one or more processors of the computing device, sensor data with human labeler data, where the sensor data is obtained through one or more sensors communicably coupled to the one or more processors; and
    creating and training, by the one or more processors, a unified machine learning model based on features associated with the classified sensor data based on the human labeler data, wherein the features comprise human labeler influences as obtained from the human labeler data associated with the sensor data;
    wherein training is further to facilitate the unified machine learning model to interpret, based on the human labeler data, the human labeler influences according to one or more environments prior to embedding the one or more human labeler influences in the one or more environments, wherein the interpretation of the human influences is based on acceptances of human behavior and exceptions to the human behavior as derived from the human labeler data and based on a relevance between the sensor data and the human labeler data, wherein the relevance identifies meaning of the sensor data based on human behavior corresponding to the human labeler data, and wherein the acceptances of the human behavior are based on verified data obtained from one or more of personal profiles, cultural traits, historical norms, societal preferences, personal prejudices, societal biases, or habits.

2. The machine-readable medium of claim 1, wherein the operations further comprise:
    detecting the sensor data through the one or more sensors including one or more of a camera, a microphone, a touch sensor, a capacitor, a radio component, a radar component, a scanner, and an accelerometer; and monitoring the human labeler data to determine one or more of human behaviors and human variables, wherein the human labeler data is obtained through multiple sources including one or more of the one or more sensors, historical data, categorical data, and personal profiles.

3. The machine-readable medium of claim 2, wherein the operations further comprise prior to classifying the sensor data, evaluate the human behaviors and human variables and their association with the sensor data.

4. The machine-readable medium of claim 3, wherein the operations further comprise:

filtering out one or more of the human variables associated with one or more of inaccuracies, unintended consequences, and biases, wherein the filtered out one or more human variables include one or more of age, gender, race, ethnicity, national origin, religion, and sexual orientation, and wherein the filtered out one or more human variables further include one or more of accidental acts and coincidental items; and recognizing and considering one or more variances between first human variables and second human variables in application of the first and second human variables in training the machine learning model.

5. The machine-readable medium of claim 1, wherein the unified machine learning model is created and trained in an early fusion machine learning environment.

6. The machine-readable medium of claim 1, wherein the operations further comprise creating and training multiple machine learning models such that each of the multiple machine learning models is based on first features of the features associated with the sensor data or second features of the features associated with human labeler data.

7. The machine-readable medium of claim 6, wherein the operations further comprise computing scores based on average outcomes obtained from the multiple machine learning models associated with the sensor data and the human labeler data, wherein the scores are maintained in one or more databases to be used with creation and training of future machine learning models, wherein the computing device includes one or more processors comprising one or more of a graphics processor and an application processor, wherein the graphics processor and the application processor are co-located on a common semiconductor package.

8. A method comprising:

detecting sensor data via one or more sensors of a computing device;

accessing human labeler data at one or more databases coupled to the computing device;

evaluating relevance between the sensor data and the human labeler data, wherein the relevance identifies meaning of the sensor data based on human behavior corresponding to the human labeler data;

associating, based on the relevance, human labeler data with the sensor data to classify the sensor data as labeled data; and training, based on the labeled data, a machine learning model to extract human influences from the human labeler data, and embed one or more of the human influences in one or more environments representing one or more physical scenarios involving one or more humans;

wherein training is further to facilitate the machine learning model to interpret, based on the human labeler data, the human influences according to multiple environments prior to embedding the one or more human influences in the one or more environments, wherein the interpretation of the human influences is based on acceptances of the human behavior and exceptions to the human behavior as derived from the human labeler data and based on the relevance, and wherein the acceptances of the human behavior are based on verified data obtained from one or more of personal profiles, cultural traits, historical norms, societal preferences, personal prejudices, societal biases, or habits.

9. The method of claim 8, wherein the exceptions to the human behavior are based on unverified data obtained from one or more of coincidences, accidents, inaccuracies, flukes, and unintended consequences; and wherein one or more of the human behaviors are filtered out based on one or more of the exceptions to avoid associating inaccuracies to the human influences.

10. The method of claim 8, wherein the relevance is further based on a human-variables portion of the human behavior, wherein the human-variables portion is based on human variables that incite personal prejudices or societal biases, wherein the human variables include one or more of age, gender, race, ethnicity, national origin, political affiliation, religious association, and sexual orientation.

11. The method of claim 8, wherein the machine learning model includes a unified machine learning model based on the sensor data and the human labeler data, wherein the unified machine learning model is employed during an early fusion scheme of a multimodal machine learning environment, wherein the early fusion scheme represents early fusing of the sensor data and the human labeler data.

12. The method of claim 8, wherein the machine learning model includes separate machine learning models, wherein a first machine learning model of the separate machine learning models is based on the sensor data and not the human labeler data, wherein a second machine learning model of the separate machine learning models is based on the human labeler data and not the sensor data, and wherein the separate machine learning models are employed during a late fusion scheme of a multimodal machine learning environment, wherein the late fusion scheme represents late fusing of the sensor data and the human labeler data.

13. The method of claim 12, further comprising:

obtaining a first score from the first machine learning model associated with the sensor data;

obtaining a second score from the second machine learning model associated with the human labeler data;

averaging the first and second scores; and maintaining the averaged first and second scores at the one or more databases to be applied to subsequent trainings of the separate machine learning models.

14. The method of claim 13, wherein the method is facilitated by one or more processors comprising one or more of a graphics processor and an application processor, wherein the graphics processor and the application processor are co-located on a common semiconductor package, and wherein the one or more sensors include one or more of a camera, a microphone, a touch sensor, a capacitor, a radio component, a radar component, a scanner, and an accelerometer.

15. An apparatus comprising:

one or more processors to:

classify sensor data with human labeler data, where the sensor data is obtained through one or more sensors communicably coupled to the one or more processors; and create and train a unified machine learning model based on features associated with the classified sensor data based on the human labeler data, wherein the features comprise human labeler influences as obtained from the human labeler data associated with the sensor data;

wherein training is further to facilitate the unified machine learning model to interpret, based on the human labeler data, the human labeler influences according to one or more environments prior to embedding the one or more human labeler influences in the one or more environments, wherein the interpretation of the human influences is based on acceptances of human behavior and exceptions to the human behavior as derived from the human labeler data and based on a relevance between the sensor data and the human labeler data, wherein the relevance identifies meaning of the sensor data based on human behavior corresponding to the human labeler data, and wherein the acceptances of the human behavior are based on verified data obtained from one or more of personal profiles, cultural traits, historical norms, societal preferences, personal prejudices, societal biases, or habits.

16. The apparatus of claim 15, wherein the one or more processors are further to:
  detect the sensor data through the one or more sensors including one or more of a camera, a microphone, a touch sensor, a capacitor, a radio component, a radar component, a scanner, and an accelerometer; and
  monitor the human labeler data to determine one or more of human behaviors and human variables, wherein the human labeler data is obtained through multiple sources including one or more of the one or more sensors, historical data, categorical data, and personal profiles.

17. The apparatus of claim 16, wherein the one or more processors are further to prior to classifying the sensor data, evaluate the human behaviors and human variables and their association with the sensor data.

18. The apparatus of claim 17, wherein the one or more processors are further to filter out one or more of the human variables associated with one or more of inaccuracies, unintended consequences, and biases, wherein the filtered out one or more human variables include one or more of age, gender, race, ethnicity, national origin, religion, and sexual orientation, and wherein the filtered out one or more human variables further include one or more of accidental acts and coincidental items, wherein the one or more processors are further to recognize and consider one or more variances between first human variables and second human variables in application of the first and second human variables in training the machine learning model.

19. The apparatus of claim 15, wherein the unified machine learning model is created and trained in an early fusion machine learning environment.

20. The apparatus of claim 15, wherein the one or more processors are further to:
  create and train multiple machine learning models such that each of the multiple machine learning models is based on first features of the features associated with the sensor data or second features of the features associated with human labeler data; and
  compute scores based on average outcomes obtained from the multiple machine learning models associated with the sensor data and the human labeler data, wherein the scores are maintained in one or more databases to be used with creation and training of future machine learning models, wherein the one or more processors comprise one or more of a graphics processor and an application processor, wherein the graphics processor and the application processor are co-located on a common semiconductor package.

* * * * *